(No Model.)

J. H. KROM & W. H. BIGGS.
MILKING MACHINE.

No. 469,577. Patented Feb. 23, 1892.

Witnesses.
Robert Everett.
J. H. Daly.

Inventors.
John H. Krom
William H. Biggs.
By James L. Norris, Atty.

UNITED STATES PATENT OFFICE.

JOHN H. KROM, OF CREAGERSTOWN, AND WILLIAM H. BIGGS, OF ROCKY RIDGE, MARYLAND.

MILKING-MACHINE.

SPECIFICATION forming part of Letters Patent No. 469,577, dated February 23, 1892.

Application filed June 26, 1890. Serial No. 357,453. (No model.)

*To all whom it may concern:*

Be it known that we, JOHN H. KROM, of Creagerstown, and WILLIAM H. BIGGS, of Rocky Ridge, in the county of Frederick, in the State of Maryland, citizens of the United States, have invented a new and useful Milking-Machine, of which the following is a specification.

Our invention relates to that class of milking-machines in which the milk is drawn from the udder by the pressure of rollers carried by rotary heads or disks acting in conjunction with spring-pressed plates by which the teats are held against said rollers while the animal is milked.

The invention consists in the construction, combination, and relative arrangement of parts in a milking-machine, as hereinafter more fully described, and then pointed out in the claims.

Figure 1:
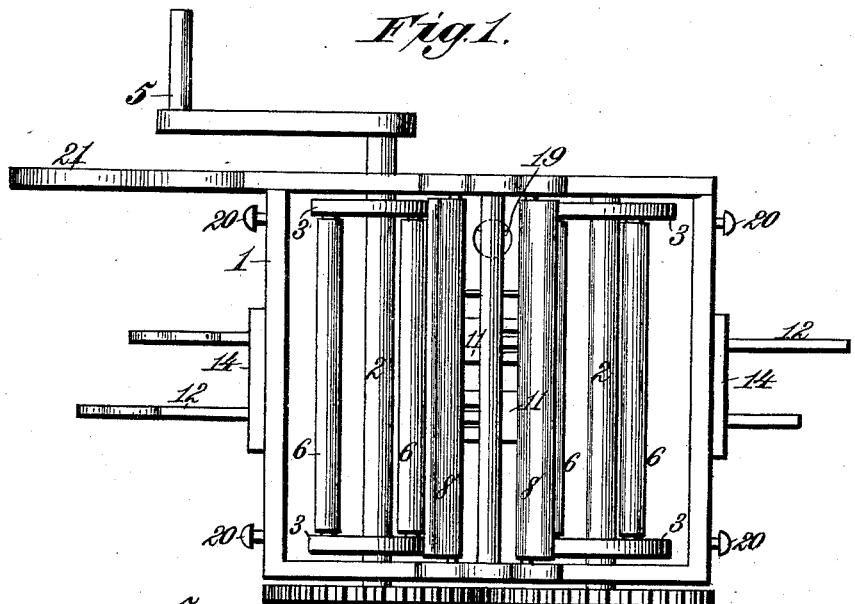
Figure 2:
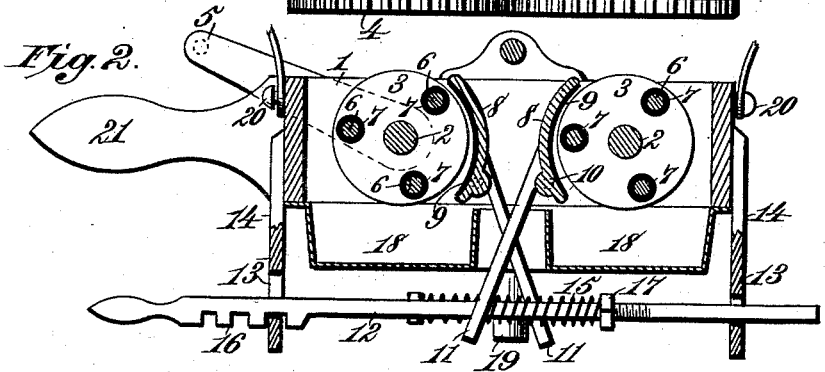
Figure 3:
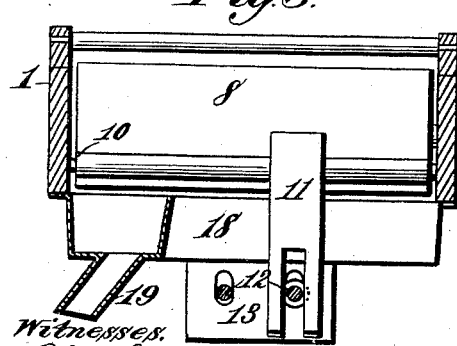
Figure 4:
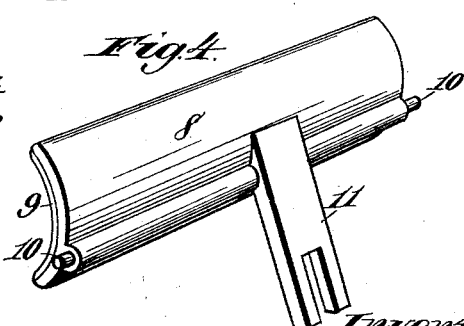

In the annexed drawings, illustrating the invention, Figure 1 is a plan of our improved milking-machine. Fig. 2 is a vertical longitudinal section of the same. Fig. 3 is a vertical transverse section. Fig. 4 is a detail view of one of the concave pressure-plates.

Referring to the drawings, the numeral 1 designates a rectangular frame, in each end of which is journaled a transverse shaft 2. These shafts 2 are each provided near their ends with heads or disks 3, that are located inside the machine-frame. On one side of the machine the ends of the shafts 2 are connected by any suitable gearing 4, arranged to cause the said shafts 2 and attached disks or heads 3 to revolve in opposite directions when actuated by a crank 5, attached to one of the shafts, preferably on the other side of the machine. In each pair of rotary heads 3 is journaled a series of rollers 6, of which there may be three or four, more or less, in each set. These rollers 6 are provided from end to end with an elastic covering 7 of white india-rubber or similar cleanly and yielding material.

Journaled in the lower central portion of the machine-frame 1, between the two sets of elastic rollers 6, are two reversely-arranged concave pressure-plates 8, each of which is provided on its concave side adjacent to the rollers 6 with an elastic lining 9 of white india-rubber or similar yielding substance. The concave pressure-plates 8 are each provided with journals or pivots 10 on their lower edges, by which they are supported in the machine-frame in such a manner as to be capable of adjustment to and from the respective sets of rollers. To the back of each concave pressure-plate 8 is secured a depending bifurcated arm 11, that loosely straddles a longitudinally-movable bar 12, supported in slotted guides 13, formed in depending bracket-arms 14 at each end of the machine-frame. There are two of these bars 12 arranged side by side in their respective guides, and the forked or depending bifurcated arms 11, attached to the pressure-plates, are so arranged as to pass by each other for the purpose of engaging their respective bars. To each bar 12 is secured one end of a surrounding spiral spring 15, the other end of which is arranged to bear against the adjacent forked arm 11 of one of the pressure-plates. Each bar 12 is formed at one end with a handle and adjacent thereto is provided on its lower edge with a rack 16 to engage and interlock with the lower end of the adjacent slotted guide.

In operation a pair of teats are placed between each set of rotating rollers 6 and the accompanying concave pressure-plate 8, and the crank 5 is turned in the proper direction to cause the shaft 2 and attached heads or disks 3 to rotate in opposite directions, inward and downward, thereby bringing the several rollers 6 successively in contact with the teats and causing them to roll downward thereon with sufficient elastic pressure to draw the milk without injury or discomfort to the animal. During this operation the concave pressure-plates 8 serve to hold or support the teats against the pressure exerted by the rollers. By means of the longitudinally-movable racked bars 12 and their surrounding spiral springs 15, acting on the arms or levers 11, the concave pressure-plates 8 can be readily adjusted and secured in any desired position to exert the proper degree of pressure, according to the size of the teats. In order to regulate the tension of the springs 15, nuts 17 may be provided, if desired. The elastic covering 7 of the rollers 6 and the elastic lining 9 of the concave pressure-plates 8 enable these devices to exert the requisite pressure on the teats without liability of bruising them.

For the purpose of receiving the milk as it is drawn troughs 18 may be attached at each end to the under side of the machine-frame and be connected on one or both sides by a cross-trough or passage having a discharge-spout 19 to conduct the milk into a suitable vessel or receptacle. We would have it understood, however, that we do not claim these devices, as a similar construction is common in machines of this character.

The opposite ends of the machine-frame may be provided with buttons 20 for attaching the machine to straps or to a belt of canvas or other material suspended from the back of the animal; but we would have it understood that we do not confine ourselves to this or any other mode of supporting the machine.

While the machine is in operation it may be steadied by means of a handle-bar 21, attached in any suitable position.

What we claim as our invention is—

1. In a milking-machine, the combination, with rotary heads arranged in pairs and sets of elastic-covered rollers supported in and carried by said heads, of adjustable concave pressure-plates journaled at their lower edges between said sets of rollers and each provided with an elastic lining, and means for adjusting said plates to and from the rollers and securing them in adjusted position, substantially as described.

2. In a milking-machine, the combination, with a set of rollers mounted in rotary heads, of a pressure-plate pivoted or journaled adjacent to said rollers and provided with a depending forked arm or lever, a longitudinally-movable bar engaged in the forked end of said lever and provided with a rack to engage a slotted guide in which said bar is supported, and a spiral spring attached to and surrounding said bar and having one end arranged to bear on the forked lever to adjust the pressure-plate to and from the rollers, substantially as described.

3. In a milking-machine, the combination, with rotary heads arranged in pairs and sets of rollers supported in and carried by said heads, of pressure-plates journaled between said sets of rollers and provided with depending arms or levers, longitudinally-movable bars engaged with said levers and provided with springs adapted to bear on the levers and adjust the pressure-plates to and from the rollers, and means for securing the said bars to hold the pressure-plates in an adjusted position, substantially as described.

4. In a milking-machine, the combination of a frame, shafts journaled therein and provided with rigidly-attached rotary heads, a set of rollers supported and carried by each pair of rotary heads, concave pressure-plates journaled or pivoted in said frame between the sets of rollers, mechanism for adjusting the said plates to and from the rollers, and means for securing the pressure-plates in an adjusted position, substantially as described.

JOHN H. KROM.
WILLIAM H. BIGGS.

Witnesses:
BERNARD COLLIFLOWER,
JOSEPH A. GERNAUD.